United States Patent [19]

Wawretschek

[11] 3,917,836

[45] Nov. 4, 1975

[54] ANTITUSSIVUM

[75] Inventor: Helmuth Wawretschek, Berlin, Germany

[73] Assignee: Servomed Arznei GmbH & Co Pharma KG, Germany

[22] Filed: Mar. 25, 1974

[21] Appl. No.: 454,501

[52] U.S. Cl. .................................. 424/251; 424/330
[51] Int. Cl.$^2$ ............... A61K 31/505; A61K 31/135
[58] Field of Search ............................ 424/251, 330

[56] References Cited
OTHER PUBLICATIONS

Merck Index, 1968, pp. 618 and 767.

New Drugs, 1966, AMA, p. 224–225.
Chemical Abstract Formula Index, 8th Collective Index, "Orotic Acid," p. 21796s–21799s.

*Primary Examiner*—Norman A. Drezin
*Attorney, Agent, or Firm*—Pollock, Philpitt & Vande Sande

[57] ABSTRACT

Antitussive composition comprising as active ingredient l-α-1,2-diphenyl-2-propionoxy-3-methyl-4-dimethyl amino butanehydroorotate and/or mixture of l-α-1,2-diphenyl-2-propionoxy-3-methyl-4-dimethyl amino butane hydrochloride and orotic acid.

9 Claims, No Drawings

ANTITUSSIVUM

The present invention relates to an antitussive.

In the international literature, the effect of the hitherto used antitussives is regarded as either uncertain (H. Friebel; DA No. 45 of 11.11.1967, p. 2399) or, for a more reliable action, as linked with considerable side effects such as triggering for example central analgesia, respiratory depression or sickness (H. Friebel; DA No. 45 of 11.11.1967, p. 2399). This is particularly true of the antitussive par excellence, codeine (J. W. Belville et al; Anesthesieology 19, 1958). Naturally, this means that the use of these antitussives is restricted, particularly in the case of application over a prolonged period or at a relatively high dosage.

The antitussive action of L-α-1,2-diphenyl-2-propionoxy-3-methyl-4-dimethyl amino butane (Levopropoxyphene) is already known (C. M. Gruber et al; J. Ind. Med. Assn. 1961; W. A. Abruzzi; J. New Drugs 2, 310, 1962; G. M. Gruber and C. H. Carter; Am. J. Sci. 1961, Oct.). The side effects observed are described as minimal (B. Calesnick, J. A. Christensen and J. C. Munch; Am. J. Med. Sci. 242, 560, 1961; S. M. Chernish et al; Ann. Allergy 21, 677 (1963); W. A. Abruzzi; J. New Drugs 2, 310, 1962) and differ hardly at all from those triggered by placebos (S. M. Chernish et al; Ann. Allergy 21, 677 (1963); W. A. Abruzzi; J. New Drugs 2, 310, 1962), and also central analgesic effects or sickness were not observed (Miller, Robbins, Meyers, 1963, J. pharm. Sci. 52, 446; W. B. Eddy et al; WHI, Geneva 1970, p. 192 and p. 242-243). The antitussive action of Levopropoxyphene is indicated in the literature, in comparison with codeine, as being approximately one-sixth, which means it is very weak (B. Calesnick, J. A. Christensen and J. C. Munch; Am. J. Med. Sci. 242, 560, 1961; H. A. Bickermann et al; Am. J. Med. Sci 234, 191, 1957).

It is therefore an object of the present invention to prepare an antitussive which does not have the above disadvantages and which has a stronger antitussive action than codeine.

According to the invention, this problem is resolved in that the antitussive contains a pharmaceutically acceptable carrier and L-α-1,2-diphenyl-2-propionoxy-3-methyl-4-dimethylamino butane-hydroorotate of the formula:

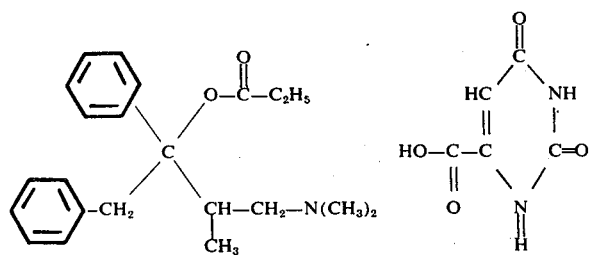

(hereinafter referred to as Levopropoxyphenorotate and/or a mixture of L-α-1,2-diphenyl-2-propionoxy-3-methyl-4-dimethyl amino butanehydrochloride and orotic acid in a molar ratio of 1 : 1 (hereinafter referred to as Levopropoxyphene-HCl + orotic acid).

Two examples will be used to illustrate the production of Levopropoxyphenorotate:

a. 17 g L-α-1,2-diphenyl-2-propionoxy-3-methyl-4-dimethyl aminobutane are dissolved in 50 ml methanol and added to a suspension of 7.8 g orotic acid in 50 ml water. The reaction mixture is heated to 50°C with agitation until a clear solution is formed. After cooling, acetone is added to the solution until turbidity results.

After being left to stand overnight, the product is deposited as a colourless finely crystalline powder. It is filtered off, washed with acetone and dried in a vacuum at 60°C.

Yield: 23.5 g, corresponding to 95% of the theoretical.

b. 68 g L-α-1,2-diphenyl-2-propionoxy-3-methyl-4-dimethyl amino butane are dissolved in 100 ml ethanol and added to a suspension of 29 g orotic acid in 100 ml ethanol.

The reaction mixture is heated to 50°C and stirred for 2 hours.

After cooling, the product is filtered from the resultant salt and from the filtrate, quantities of the product left in solution are precipitated by the addition of acetone. Levopropoxyphenorotate is formed as a colourless powder in a quantity of 82 g, corresponding to 89% of the theoretical.

Levopropoxyphenorotate has a very intensive bitter taste. It is soluble in water and methanol to approximately 1% but in other organic solvents it is insoluble. In the case of the addition of acids or bases to the aqueous solution, the salt decomposes with separation of orotic acid and Levopropoxyphene.

Total formula:

$C_{27} H_{33} N_3 O_6$ or $C_{22} H_{29} NO_2 \cdot C_5 H_4 N_2 O_4$

Molar weight:

495.58

Determination of contents:

alkalimetric titration in methanol:
99.0% $C_{27} H_{33} N_3 O_6$

Determination of moisture using the Karl-Fischer method:

1.22% water

Specific optical rotation:

− 30° (c = 1, water)
− 22.5° (c − 1, methanol)

Setting point:

The setting point cannot be established due to decomposition of the substance in a wide range of temperatures.

As demonstrated by the following comparison of the two $ED_{50}$ for codeine phosphate and Levopropoxyphenorotate, the compound according to the invention is markedly superior to codeine in its antitussive effect in a cough test (guinea pigs; 7.5% citric acid aerosol). The $ED_{50}$ values calculated using the Gauss integral are 170 mg ± 13 mg for codeine phosphate 79 mg ± 8 mg for Levopropoxyphenorotate This superiority of L-propoxyphenorotate in the antitussive action is also reflected in Table I.

Table I

Percentage cough inhibition after oral application (guinea pig; 7.5% citric acid aerosol)

| | 25 | 50 | 75 | 100 | 150 | 200 | mg/kg |
|---|---|---|---|---|---|---|---|
| Codeine phosphate | — | — | — | 7 | 40 | 67 | |
| Levopropoxyphen-orotate | 6 | 31 | 47 | 56 | — | — | |
| Levopropoxyphene-HCl | — | 8 | — | 11 | — | 9 | |

A dosage of 100 mg/kg, Levopropoxyphenorotate already demonstrates a strong antitussive action; on the other hand, the codeine phosphate is virtually ineffectual at this dosage.

The same applies to Levopropoxyphene at all rates of dosage investigated.

The advantages of the antitussive according to the invention resides particularly in that, in contrast to codeine, it does not have any sickness-occasioning effect, as well as in that the $ED_{50}$ level is substantially lower than in the case of codeine so that a reduced dose is possible, and in that a marked antitussive action occurs after just 30 minutes at a lower dosage.

A surprisingly identical physico-chemical behaviour to Levopropoxyphenorotate is demonstrated by a mixture of Levopropoxyphenohydrochloride and orotic acid in a molar ratio of 1 : 1. This mixture consists of
70.7% Levopropoxyphene hydrochloride and
29.3% orotic acid.

While orotic acid is only slightly (0.17%; Merck Index; 8th edition) soluble in water (pH = 7), the above-described mixture dissolves to about 1%, this value corresponding to the solubility of Levopropoxyphenorotate.

In vitro resorption tests (Sartorius resorption model) likewise reveal an equivalent behaviour (see Table II).

Table II

In vitro resorption of Levopropoxyphenorotate and Levopropoxyphenene-HCL + orotic acid

| | ($n_4{}^h$) L-propoxyphene | orotic acid |
|---|---|---|
| Levopropoxyphenorotate: | 2.39 mg | 0.11 mg |
| Levopropoxyphene-HCl + orotic acid | 2.47 mg | 0.14 mg |

Finally, the antitussive according to the invention may also contain a mixture of Levopropoxyphenorotate and Levopropoxyphene-HCl and orotic acid in a molar ratio of 1 : 1.

Also the test described hereinafter demonstrates the efficacy of the antitussive according to the invention:

A 2% solution of L-α-1,2-diphenyl-2-propionoxy-3-methyl-4-dimethyl amino butane-orotate was made up in aqua bidest without other additives. The pH value was 5.8. The solution was injected intravenously into guinea pigs after sterile filtration. For comparison, corresponding codeine solutions were injected intravenously.

For the cough test, the following mean effective doses were found (method according to A. Turner modified for intravenous application):

Mean effective doses in the cough test on guinea pigs in mg/kg

| | Min. | 5 | 10 | 15 |
|---|---|---|---|---|
| Codeine | | 21 | 23 | 29 |
| L-propoxyphenorotate | | 9 | 4 | 4 |

It was evident that L-propoxyphene-orotate is substantially more strongly effective than codeine.

For its use in medical quantities, the antitussive according to the invention may be clothed in various pharmaceutical preparations which permits an easy administration. Three examples of embodiment which in no way limit the invention are set out hereinafter:

EXAMPLE 1

1 g  L-α-1,2-diphenyl-2-propionoxy-3-methyl-4dimethyl amino butane
   hydroorotate and
5 g mannite
are blended and filled into 100 capsules. The ideal dosage for oral application for a 3 to 4 hour cough obstruction, is 1 capsule for an adult.

EXAMPLE 2:

Instead of L-α-1,2-diphenyl-2-propionoxy-3-methyl-4-dimethyl-amino butane-hydroorotate
   707 mg Levopropoxyphene-hydrochloride and
   293 mg orotic acid and
   5 mg mannite
were made up according to Example 1.

EXAMPLE 3:

A sterile solution was prepared from
   500 mg L-α-1,2-diphenyl-2-propionoxy-3-methyl-4-dimethyl amino-butane-hydroorotate
   20 mg benzyl alcohol and
   aqua bidest, to 100 ml.

For a 3 to 4 hour cough obstruction in an adult, the intravenous application of 1 ml of this solution is recommended.

I claim
1. An antitussive composition comprising an effective antitussive amount of an agent selected from the group consisting of: L-α-1,2-diphenyl-2-propionoxy-3-methyl-4dimethyl amino butanehydroorotate of the formula:

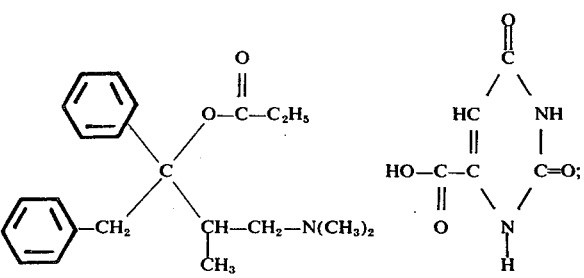

a mixture of L-α-1,2-diphenyl-2-propionoxy-3-methyl-4-dimethyl amino butane-hydrochloride and orotic acid in a molar ratio of 1:1; and mixtures thereof in admixture with a pharmaceutically acceptable carrier.

2. The antitussive composition of claim 1 wherein said agent is L-α-1,2-diphenyl-2-propionoxy-3-methyl-4-dimethyl amino butane-hydroorotate.

3. The antitussive composition of claim 1 wherein said agent is a mixture of L-α-1,2-diphenyl-2-propionoxy-3-methyl-4-dimethyl amino butane-hydrochloride and orotic acid in a molar ratio of 1:1.

4. A method of inhibiting cough in a patient which comprises administering to said patient an antitussive composition comprising an effective antitussive amount of an agent selected from the group consisting of L-α-1,2-diphenyl-2-propionoxy-3-methyl-4-dimethyl-amino-butane-hydroorotate of the formula:

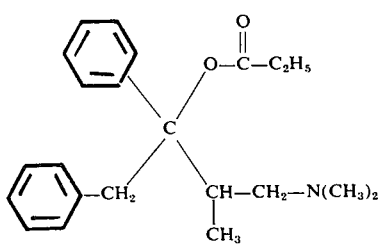

a mixture of L-α-1,2-diphenyl-2-propionoxy-3-methyl-4dimethylamino-butane-hydrochloride and orotic acid in a molar ratio of 1:1; and mixtures thereof.

5. The process of claim 4 wherein said antitussive agent is L-α-1,2-diphenyl-2-propionoxy-3-methyl-4-dimethylamino butane-hydroorotate.

6. The process of claim 4 wherein said antitussive agent is a mixture of L-α-1,2-diphenyl-2-propionoxy-3-methyl-4-dimethyl amino butane-hydrochloride and orotic acid in a molar ratio of 1:1.

7. The process of claim 4 which comprises orally administering a capsule containing L-α-1,2-diphenyl-2-propionoxy-3-methyl-4-dimethyl-amino butane-hydroorotate to said patient.

8. The process of claim 4 which comprises orally administering to said patient a capsule containing L-α-1,2-diphenyl-2-propionoxy-3-methyl-4-dimethyl butane-hydrochloride and orotic acid.

9. The process of claim 4 which comprises intravenously administering to said patient a solution containing L-α-1,2-diphenyl-2-propionoxy-3-methyl-4-dimethyl-amino butanehydroorotate.

* * * * *